United States Patent

Akeda

[11] Patent Number: 6,061,564
[45] Date of Patent: May 9, 2000

[54] MOBILE COMMUNICATION DEVICE

[75] Inventor: Kazuo Akeda, Kanagawa, Japan

[73] Assignee: NEC Corporation, Tokyo, Japan

[21] Appl. No.: 08/943,414

[22] Filed: Sep. 30, 1997

[30] Foreign Application Priority Data

Sep. 30, 1996 [JP] Japan ................................. 8-257248

[51] Int. Cl.[7] ............................. H04Q 3/42; H04Q 7/20
[52] U.S. Cl. ........................ 455/435; 455/574; 455/38.3
[58] Field of Search ............................... 455/435, 440, 455/441, 571, 572, 573, 574, 550, 38.3, 127, 343

[56] References Cited

U.S. PATENT DOCUMENTS

| | | | |
|---|---|---|---|
| 5,140,695 | 8/1992 | Yasuda et al. | 455/450 |
| 5,195,127 | 3/1993 | Ichikawa et al. | 455/435 |
| 5,379,451 | 1/1995 | Nakagoshi et al. | 455/435 |
| 5,710,975 | 1/1998 | Bernhardt et al. | 455/38.3 |
| 5,799,256 | 8/1998 | Pombo et al. | 455/574 |
| 5,839,069 | 11/1998 | Keshavachar et al. | 455/437 |

FOREIGN PATENT DOCUMENTS 7-87010  3/1995  Japan .

*Primary Examiner*—Dwayne D. Bost
*Assistant Examiner*—Erika A. Gary
*Attorney, Agent, or Firm*—Foley & Lardner

[57] ABSTRACT

Disclosed is a mobile communication device which has: a position registration controller which controls a position registration process where a position of the mobile communication device is registered to a base station; a transmitting circuit which transmits a position registration control signal for the mobile communication device which is processed by the position registration controller; a receiving circuit which receives a position registration control signal for the base station to be transmitted from the base station; a high-speed movement judging circuit which judges whether the mobile communication device is moving at a high speed or not by monitoring an interval of position registration; a power source controller which controls a power source to be supplied to functional circuits with an intermittent operation time to be determined by an output of the high-speed movement judging circuit; a power circuit which supplies the power source to the functional circuits except at least the power source controller; and a battery which supplies the power source to the power circuit.

17 Claims, 7 Drawing Sheets

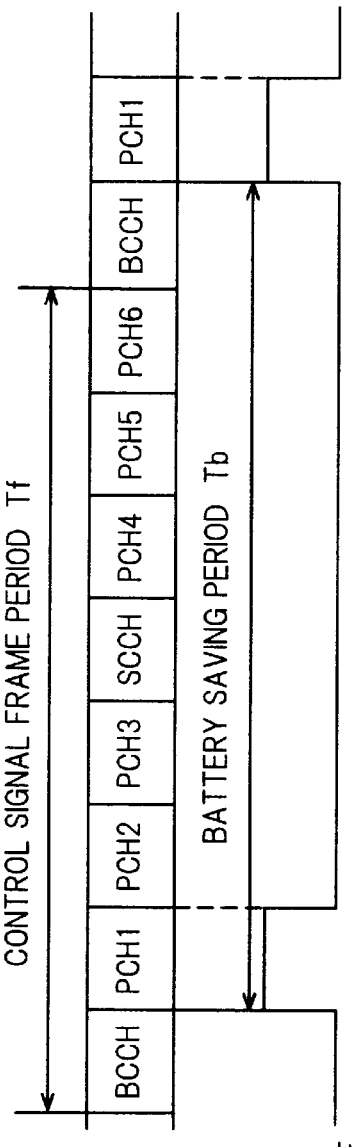

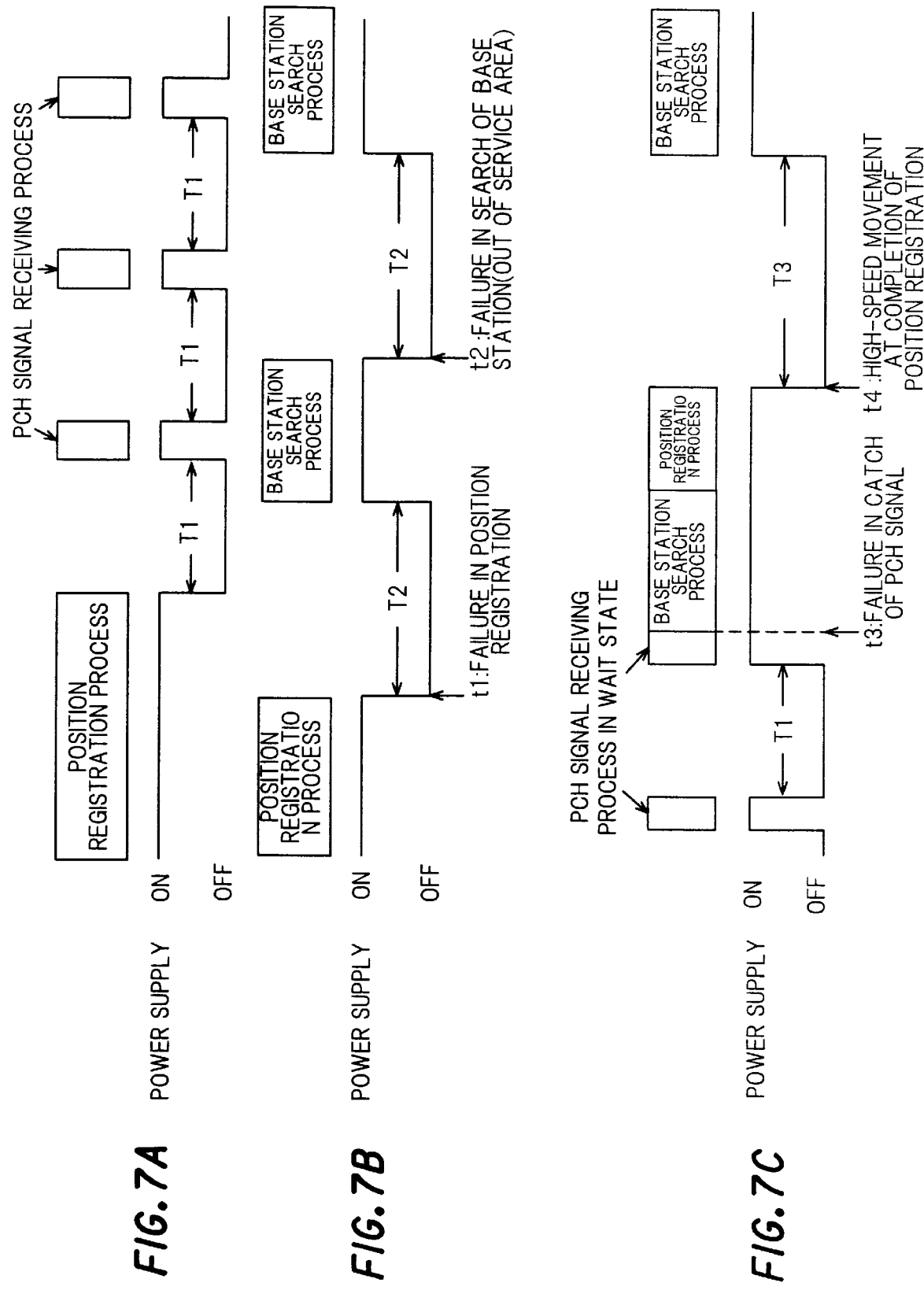

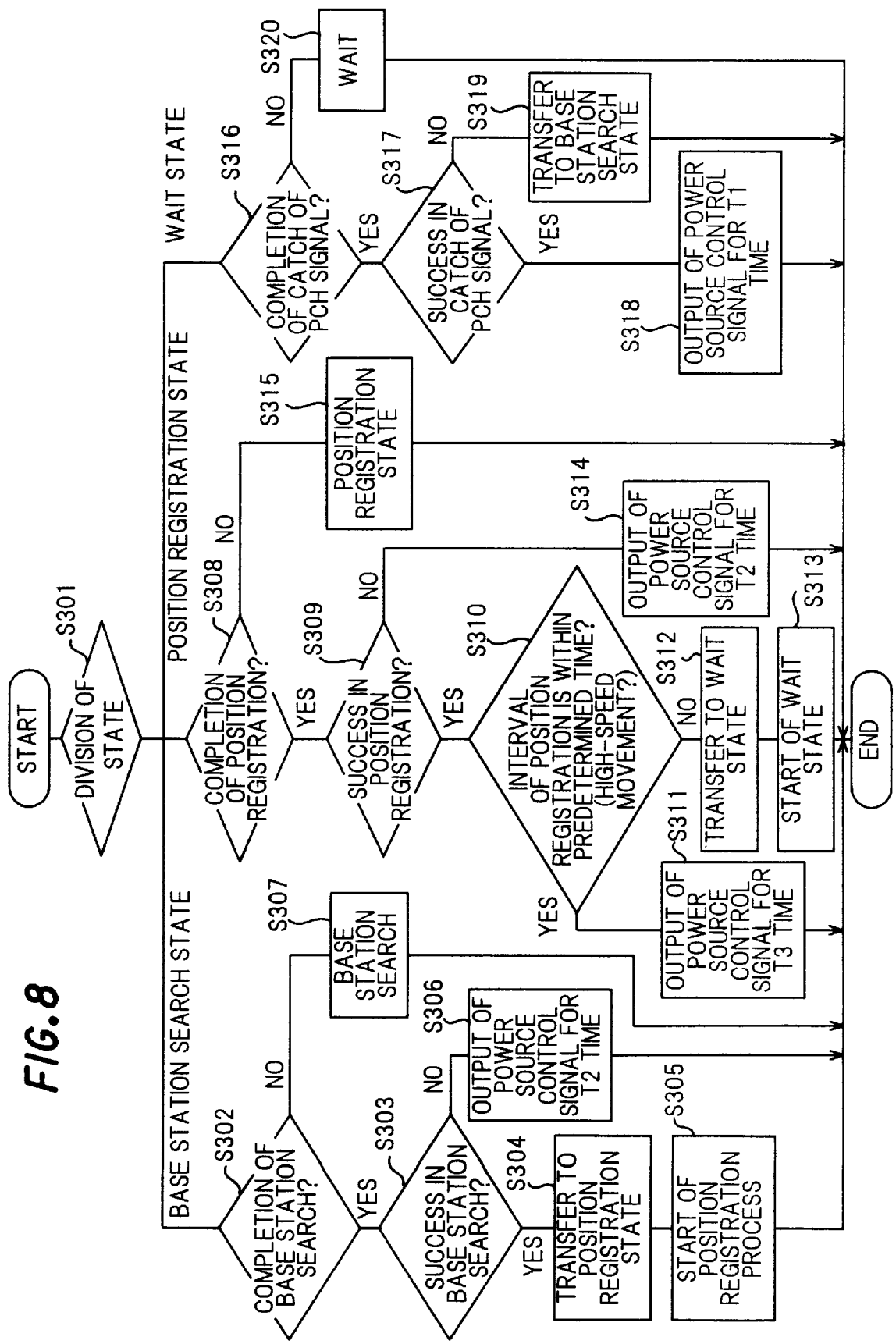

MOBILE COMMUNICATION DEVICE

FIELD OF THE INVENTION

This invention relates to a mobile communication device such as a portable telephone, and more particularly to, a mobile communication device with a function of saving its battery consumption and relates to a method of controlling the mobile communication device.

BACKGROUND OF THE INVENTION

In a mobile communication device, such as a portable telephone (hereinafter referred to as 'mobile station'), a power source is supplied from a battery, and battery consumption at the mobile station is an important factor which determines the performance of the mobile station. Therefore, it is generally conducted that a consumed current of circuit is designed as low as possible and a power source is supplied only by real operation time to each circuit block.

However, when the mobile station has a reception function, the mobile station always needs to monitor a control signal from a base station to the mobile station to receive a call signal. Also in this case, to save the battery consumption as much as possible, the control signal from the base station is intermittently received for a predetermined period which is determined between the base station and the mobile station. This period is generally called 'battery saving period'.

Taking the case of a second-generation cordless telephone such as PHS, just after turning on the power switch of the mobile station or when no control signal from the base station can be caught, e.g., since the mobile station is out of any service area, some functions of the mobile station including a receiving circuit are turned on to start an operation of catching the control signal from the base station (hereinafter referred to as 'base station search').

After catching the control signal once, the mobile station conducts an operation, i.e., waiting operation, that intermittently turns on the power source to some functions to receive the control signal to the mobile station for a battery saving period allowed by the system. In the waiting operation, no power source is supplied to any functions other than a timer circuit for measuring the battery saving period expect when the control signal is received.

When the mobile station is out of any service area, the battery saving operation is conducted to save the battery consumption since the base search station must be continued when the power source of the mobile station is switched on.

Meanwhile, in the second-generation cordless telephone system, the service area of a base station is set to have a diameter of about 100 to 200 meters and a service for the mobile station's high-speed movement is not considered. During the high-speed movement of the mobile station, where is moves out of a service area or to the nearby service area for about five minutes, the regular service cannot be obtained. However, if the power source continues to be switched on in such a case, the receiving circuit on operation frequently conducts the catching of a control signal to waste the battery despite no regular service when entering a new service area. Therefore, the mobile station telephone conducts the battery saving operation while judging the high-speed movement.

For example, a conventional portable telephone with such functions is disclosed in Japanese patent application laid-open No. 7-87010 (1995). FIG. 1 shows a circuit composition of this portable telephone with the battery saving function, and FIG. 2 is a flow chart for explaining the operation.

Some functions of the portable telephone are driven by a battery 86. The battery 86 always drives a timer 84 and a control signal reception counter 83. The other circuits, such as a receiving circuit 81 and a controller 82 are driven by a power circuit 85 powered by the battery 86. The power supplying operation of the power circuit 85 is controlled by a power source control signal from the timer 84.

The receiving circuit 81, which operates when a power source voltage thereto is supplied from the power circuit 85, demodulates a signal received from a radio circuit into reception data and sends it to the controller 82.

The controller 82 conducts a base station search operation to catch a control signal from the receiving circuit 81 just after the power source switch is turned on, and it sends instructions to the timer 84 and conducts the battery saving operation after the base station is caught. In the battery saving operation, it starts operating by receiving an interrupt signal from the timer 84, and it judges whether the mobile station is out of a service area of the base station or moving at a high speed by monitoring the control signal from the receiving circuit 81 and then sends instructions to the timer 84. When the mobile station moves out of the current service area, it is judged from a value of the control signal reception counter 83 whether it is moving at a high-speed.

When the controller 82 judges that the mobile station is within the service area from a caught control signal, it sends instructions to the timer 84 to conduct a battery saving operation for receiving a designated control signal, which is explained again later. The timer 84 actuates its internal timer TMs for the battery saving operation for reeving the designated control signal.

The timer 84 comprises the timer TMs for determining a battery saving period after catching a control signal from the base station in the base station search and a timer TM1 for determining a battery saving period in the case of catching no control signal from the base station. In the battery saving operation, these timers TMs, TM1 are actuated by the controller 82 to measure respective predetermined times to stop the operation of the power circuit 85. During this time measurements, the timer 84 gives the power source control signal to the power circuit 85 and further gives an interrupt according to the timer TMS or TM1 to the controller 82.

The control signal reception counter 83 receives a specific signal in a control signal received by the receiving circuit 81 and counts the reception number of the specific signal. From the reception number, it is judged whether the mobile station is moving at a high speed.

Next, the battery saving operation will be explained in FIG. 2.

By a control signal transmitted from the base station, a frame including a broadcast control channel(BCCH), several paging channels(PCHs) and a signaling control channel (SCCH) is repeatedly transmitted. The broadcast control channel (BCCH) serves as a frame synchronizing signal. One of the paging channels (PCHs) is corresponding to the mobile station itself.

When the mobile station is within the service area of a base station, the battery saving operation starts after a control signal is caught in the base station search and the position registration is completed. The battery saving operation is conducted with a frame unit between paging channels (PCHs) corresponding the mobile station itself. The period of the battery saving operation is determined by the timer TMs of the timer 84. In one battery saving period, the power source is supplied to the receiving circuit 81 etc. by the power circuit 85 only for the period of a paging channel (PCH) corresponding to the mobile station itself.

When the mobile station is out of the service area of a base station or moving at a high speed, a base station search to intermittently catch a control signal is conducted and a battery saving operation for this search is conducted. In this case, the timer 84 determines a battery saving period by the timer TM1. In this battery saving period, the power circuit 85 is controlled to be turned off except a period for catching the control signal. The battery saving period when the mobile station is out of the service area or moving at a high speed is set to be much longer than that in the base station search when it is within the service area, thereby reducing the consumption of the battery 86.

During the battery saving operation, the timers TMs, TM1 measures the power source stopping period, and the power circuit 85 is controlled to stop the power source supplying operation during the measurement. After completing the measurement of the power source stopping period, the timer 84 instructs the power circuit 85 to start the power source supplying operation, and then the power source is supplied to functional circuits, such as the receiving circuit 81 and controller 82. Together with the supplying of power source, the timer 84 gives an interrupt according to the timer TMs or TM1 to the controller 82.

When this interrupt is received, the controller 82 starts the flow process of searching a control signal as shown in FIG. 2. At Step S701, it is judged that the interrupt is sent from which of the timers TMs, TM1. If the interrupt is sent from the timer TM1, which means to be on base station search, catching of a control signal is conducted at Step S711. In this case, the power source turn-on time is set to be sufficiently longer than the period of a paging channel (PCH) in order to surely catch the control signal in the base station search when entering the service area.

When a paging channel (PCH) is caught at Step S711 or the power source turn-on time is passed without catching the paging channel (PCH), it proceeds to the following Step S712. At Step S712, it is judged whether the paging channel (PCH) signal is caught. If the paging channel (PCH) signal is not caught, the timer TM1 is actuated to measure the battery saving period to stop the power source at Step S707. When the timer TM1 is actuated, the timer 84 sends the power source control signal to turn off the power circuit 85 and the controller 82 waits for the next timer interrupt. Thus, the waiting operation continues.

Moving from the outside to inside of a service area is judged by that the paging channel (PCH) signal is caught at Step S712. In this case, after adding one to the control signal reception counter 83 at Step S713, the timer TMs is actuated setting a power source stopping period at Step S714. When the timer TMs is actuated, the timer 84 sends instructions through the power source control signal to turn off the power circuit 85. The controller 82 waits for the next timer interrupt. Thus, when the paging channel (PCH) signal is caught, it proceeds to the control signal waiting operation for the case that the mobile station is within a service area.

Next, a case that a process is started by an interrupt generated when the measurement of the timer TMs is completed during the control signal waiting operation will be explained below.

When it is judged by the controller 82 at Step S701 that the interrupt is sent from the timer TMs, which means that the mobile station is waiting for a control signal within a service area, it proceeds to Step S702. When the paging channel (PCH) signal is received within a wait time corresponding to the paging channel (PCH) period or the wait time is passed without receiving the paging channel (PCH) signal, it proceeds to Step S703. At Step S703, it is judged whether the paging channel (PCH) signal is received. If the paging channel (PCH) signal is received, it proceeds to Step S713 after clearing a reception failure number counter. At Step S713, the control signal reception counter 83 for counting how many times the paging channel (PCH) signals are received in the current service area is added by one. The count value of the control signal reception counter 83 is used to judge as to whether it is moving at a high speed, as explained later.

At Step S714, the timer TMs is actuated setting a power source stopping period, which is obtained by subtracting the time required to receive a PCH signal and the reception preparing time from a battery saving period for within a service area. When the timer TMs is actuated, the power circuit 85 is turned off by the power source control signal from the timer 84. Then, the controller 82 waits for the next timer interrupt. Thus, the waiting operation with the battery saving period for within a service area continues.

If the paging channel (PCH) signal is not received at Step S702, the reception failure number counter is added by one at Step S704 and then it is judged whether the value of the reception failure number counter, i.e., the number of continuous reception failures, is a reference value M, e.g., M=b 2, or more.

If the continuous failure number is less than the reference value M, it proceeds to Step S715 and the timer TMs is actuated setting a power source stopping period, which is obtained by subtracting the paging channel (PCH) time from a battery saving period for within a service area. When the timer TMs is actuated, the power circuit 85 is turned off by the power source control signal from the timer 84. Then, the controller 82 waits for the next timer interrupt. Thus, when the next interrupt is generated, the waiting operation with a period corresponding to the battery saving operation is conducted again at Step S702.

If the continuous failure number is the reference value M or more at Step S704, the reception failure number counter is cleared, and then it proceeds to Step S705. This is a case that moves outside the service area where it stayed until then. At Step S705, it is judged whether it is moving at a high speed. It is estimated that, during the high-speed movement, the number of receiving the paging channel (PCH) signal within the service area where it stayed until then is smaller than that in the case of other than during the high-speed movement since the service area changes in several seconds. Therefore, by setting a suitable reference value M and comparing it with the value of the control signal reception counter 83, it can be judged whether it is moving at a high speed.

If the value of the control signal reception counter 83 is less than the reference value M at Step S705, it is judged that it is moving at a high speed, and then it proceeds to Step S706. After clearing the control signal reception counter 83 at Step S706, the timer TM1 is actuated setting the power source stopping time with the battery saving period for outside of a service area at Step S707. When the timer TM1 is actuated, the power circuit 85 is turned off by the power source control signal from the timer 84. Then, the controller 82 waits for the next timer interrupt. Thus, during the high-speed movement, the intermittent base station search operation is conducted.

If the value of the control signal reception counter 83 is the reference value M or more at Step S705, it is judged that it moves outside the service area where it stayed until then not moving at a high speed, and then it proceeds to Step S711 after clearing the control signal reception counter 83 at Step S708. As described earlier, at Step S711, the paging channel (PCH) catching operation with the battery saving period for outside of a service area is conducted.

If the paging channel (PCH) signal is caught at Step S711, which means that the mobile station moves to the nearby service area, it proceeds through Step S712 to Step S713 where the control signal reception counter 83 is added by one, thereafter it proceeds to Step S714. At Step S714, the timer TMs is actuated setting a power source stopping period, which is obtained by subtracting the time required to receive a PCH signal and the reception preparing time from a battery saving period for within a service area. Thus, the waiting operation with a period corresponding to the battery saving operation is conducted, within the service area.

If the paging channel (PCH) signal is not caught at Step S711, which means that the mobile station moves outside of all the service area, it proceeds through Step S712 to Step S706 where the control signal reception counter 83 is cleared, thereafter it proceeds to Step S707. At Step S707, the timer TM1 is actuated setting a power source stopping period with the battery saving period for out of the service area. Thereby, the intermittent base station search operation for out of the service area is conducted.

As described above, when the mobile station is out of the service area of a base station or moving at a high speed, the intermittent base station search operation with a battery saving period which is much longer than that in case of within a service area of the base station is conducted. Therefore, the battery consumption during the high-speed movement can be saved.

In the conventional mobile communication device, whether the mobile station is moving at a high speed or not is judged from the PCH signal reception number in the waiting operation of a paging channel (PCH) signal. However, in this method, it may be judged that the mobile station is moving at a high speed even when the PCH signal cannot be temporarily received due to, e.g., an external noise. In such a case, the power source stopping period continues for a long time. When a local call is proceeded at that time, a loss at called station must be occurred. It damages the performance of the mobile communication device.

Furthermore, when the mobile station is moving at a high speed or out of any service area, the base station search operation with a period longer than the battery saving period for within a service area and a long power stopping period is intermittently conducted. However, this intermittent operation, which is only of two stages, cannot give a sufficient battery saving operation and reduce substantially the battery consumption. Namely, it is a problem that, regardless of the different situations that it is moving at a high speed and that it is out of any service area, only one power source stopping period is set.

SUMMARY OF THE INVENTION

Accordingly, it is an object of the invention to provide a mobile communication device whose battery consumption can be effectively reduced without damaging its communication performance.

It is a further object of the invention to provide a method of controlling a mobile communication device where battery consumption can be effectively reduced without damaging communication performance of the mobile communication device.

According to the invention, a mobile communication device, comprises:

a position registration controller which controls a position registration process where a position of the mobile communication device is registered to a base station;

a transmitting circuit which transmits a position registration control signal for the mobile communication device which is processed by the position registration controller;

a receiving circuit which receives a position registration control signal for the base station to be transmitted from the base station;

a high-speed movement judging circuit which judges whether the mobile communication device is moving at a high speed or not by monitoring an interval of position registration;

a power source controller which controls a power source to be supplied to functional circuits with an intermittent operation time to be determined by an output of the high-speed movement judging circuit;

a power circuit which supplies the power source to the functional circuits except at least the power source controller; and a battery which supplies the power source to the power circuit.

According to another aspect of the invention, a mobile communication device, comprises:

a position registration controller which controls a position registration process where a position of the mobile communication device is registered to a base station;

a transmitting circuit which transmits a position registration control signal for the mobile communication device which is processed by the position registration controller;

a receiving circuit which receives a paging channel signal to be transmitted from the base station and extracts a position registration control signal for the transmitting base station;

a high-speed movement judging circuit which judges whether the mobile communication device is moving at a high speed or not by monitoring an interval of position registration;

a power source controller which controls the power source controller by selecting a first intermittent operation time in case of a regular paging channel signal waiting state, selecting a second intermittent operation time longer than the first intermittent operation time in case of a failure in position registration, or selecting a third intermittent operation time longer than the second intermittent operation time in case of high-speed movement;

a power circuit which supplies a power source to functional circuits except the the power source controller while being controlled by the power source controller; and a battery which supplies the power source to the power circuit.

According to yet another aspect of the invention, a method of controlling a mobile communication device, which comprises a position registration controller which controls a position registration process where a position of the mobile communication device is registered to a base station, a transmitting circuit which transmits a position registration control signal for the mobile communication device which is processed by the position registration controller, a receiving circuit which receives a position registration control signal for the base station to be transmitted from the base station, a high-speed movement judging circuit which judges whether the mobile communication device is moving at a high speed or not by monitoring an interval of position registration, a power source controller which controls a power source to be supplied to functional circuits with an intermittent operation time to be determined by an output of the high-speed movement judging circuit, a power circuit which supplies the power source to the functional circuits except at least the power source controller, and a battery which supplies the power source to the power circuit, comprises the steps of:

searching a nearby base station;

conducting a position registration operation to a base station corresponding to the result of the nearby base station searching where the mobile communication device is within a service area;

measuring an interval of the position registration operation;

setting the intermittent operation time for power source control to be a first intermittent operation time depending on the result of the position registration operation interval measuring; and setting the intermittent operation time for power source control to be a second intermittent operation time when the mobile communication device is out of any service area as the result of the nearby base station searching.

BRIEF DESCRIPTION OF THE DRAWINGS

The invention will be explained in more detail in conjunction with the appended drawings, wherein:

FIGS. 6A and 6B are diagrams for explaining an example of a control signal format in a wait state in the embodiment according to the invention, FIGS. 7A to 7C are timing charts for explaining intermittent operations in the embodiment according to the invention, and FIG. 8 is a flow chart showing a battery saving operation in the embodiment according to the invention.

DESCRIPTION OF THE PREFERRED EMBODIMENTS

Figure 1:
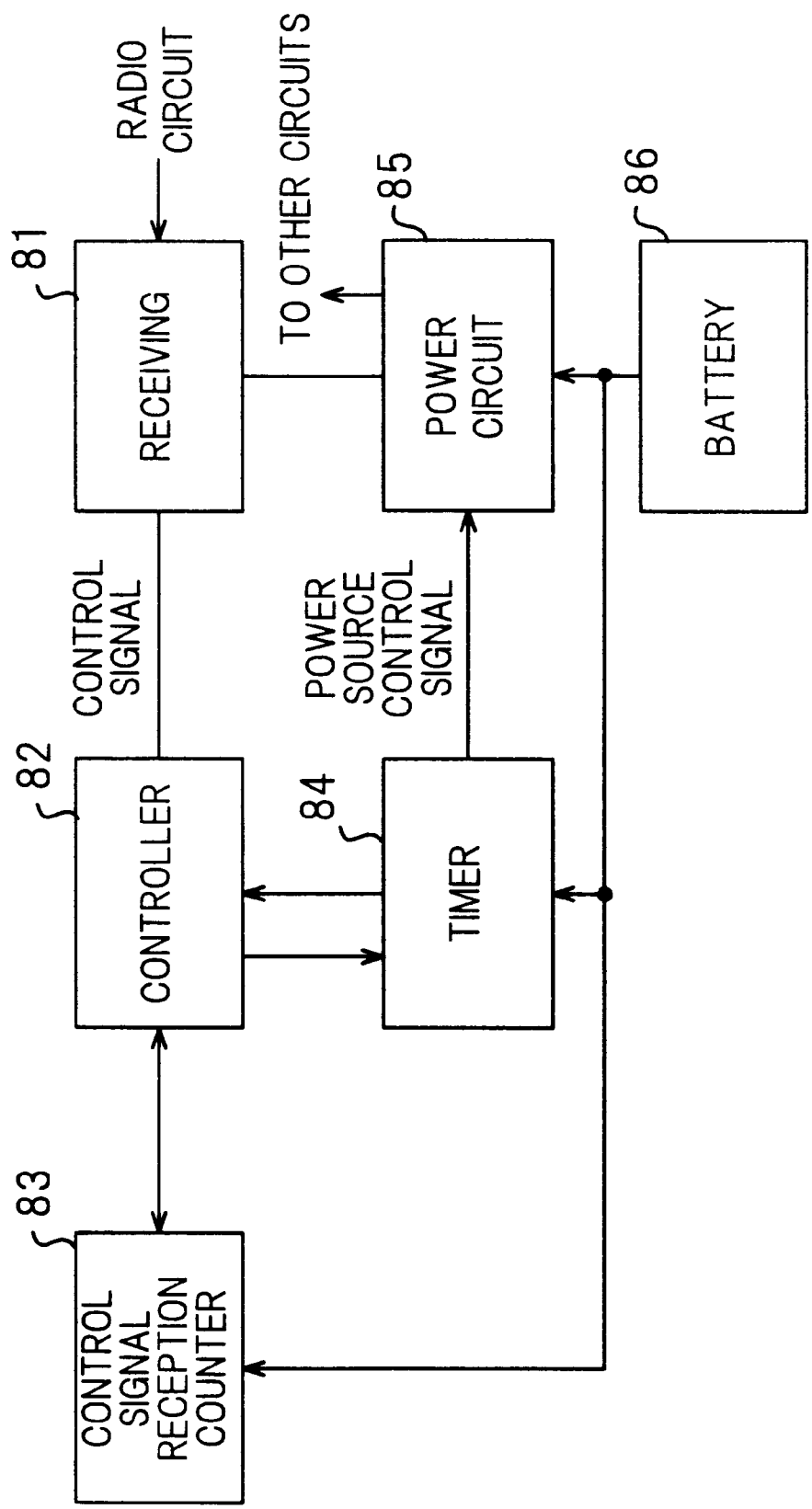
FIG. 1 is a block diagram showing the battery saving circuit of a conventional portable telephone.
Figure 2:
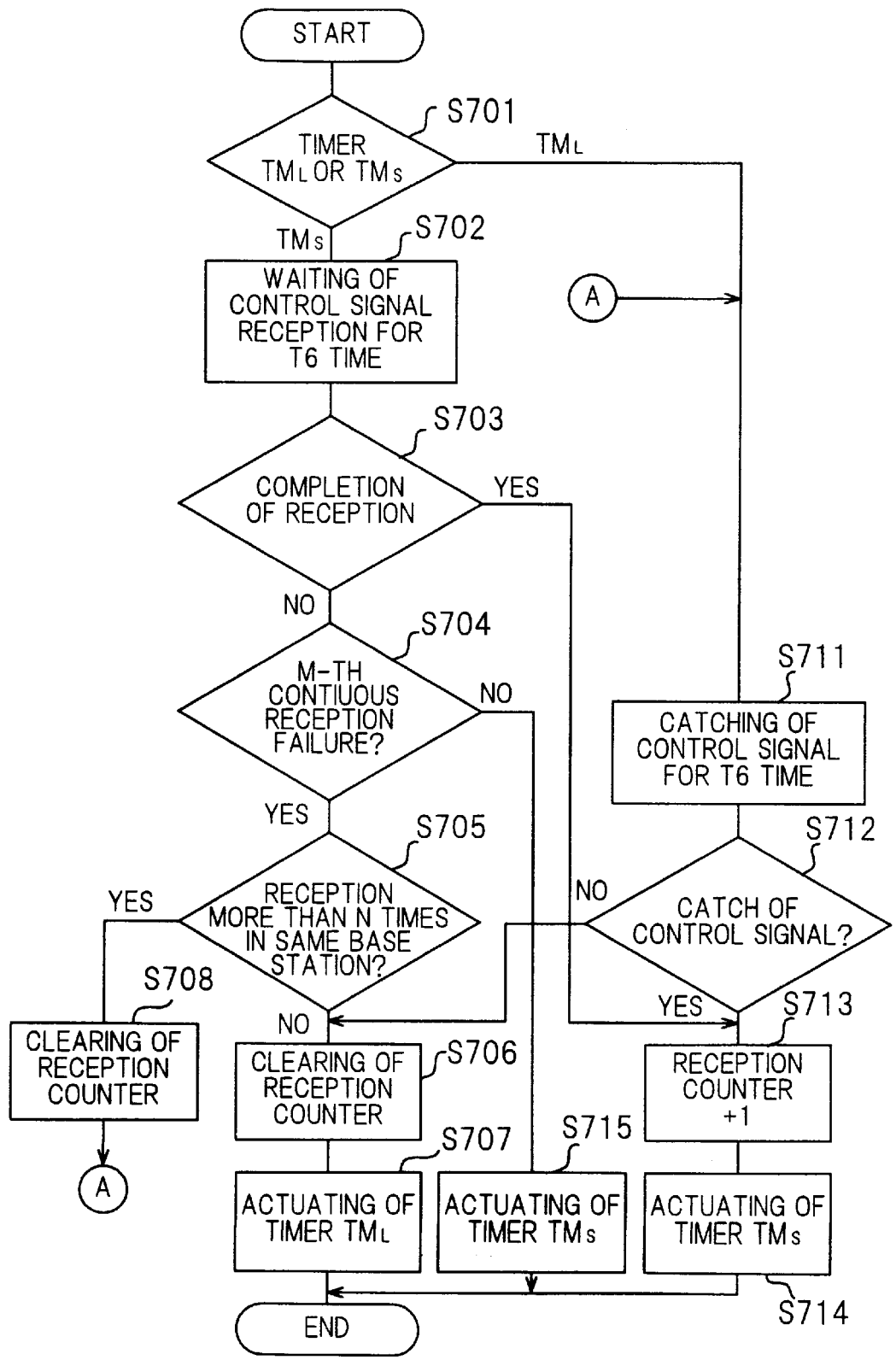
FIG. 2 is a flow chart showing the operation of the battery saving circuit in FIG. 1.

Before explaining the preferred embodiment of the invention, the principle of the invention will be explained in FIG. 3.

A receiving circuit 13 receives through an antenna a paging channel (PCH) signal included in a signal wave to be transmitted from a base station, and then it demodulates it into a control signal and sends it to a position registration controller 11.

A transmitting circuit 12 modulates a control signal from the position registration controller 11 into a signal wave which can be received by the base station and then transmits it to the base station through the antenna.

The position registration controller 11 controls a position registration operation by a control signal from the receiving circuit 13. This position registration is conducted along a procedure determined for a mobile communication system, and, if necessary, a control signal is sent through the transmitting circuit 12 to the base station. When it is out of any service area from a result of nearby base station search, a signal which shows that it is out of any service area is output. When it is within a service area, a control signal required for the position registration is transmitted and received through the transmitting circuit 12 and receiving circuit 13 to and from the base station to conduct the position registration. After completing the position registration, a position registration completion signal is output. When falling in the position registration, a signal representing the position registration failure is output. Further, when a PCH signal is received in a paging channel (PCH) waiting operation, a signal representing the reception of the PCH signal is output.

The high-speed movement judging circuit 14 measures the interval of the position registration completion signals from the position registration controller 11. When the interval of the position registration completion signals is shorter than a predetermined time, it is judged that it is moving at a high speed and a signal representing the high-speed movement is output.

The power source controller 15 counts an intermittent operation time T1 for the regular PCH signal waiting within a service area when receiving the control signal representing the position registration completion from the position registration controller 11 and the signal representing the reception of a paging channels (PCH) from the base station, counting a longer intermittent operation time T2 when receiving a signal representing the position registration failure and out of service area, and counting a longest intermittent operation time T3 when receiving a signal representing the high-speed movement from the high-speed movement judging circuit 14.

The power circuit 16 stops supplying a power source to some functions other than the power source controller 15 and a battery 17 when receiving a power source control signal from the power source controller 15.

Thus, in the invention, provided are the intermittent operation time T2 for the paging channel (PCH) signal waiting in case of the position registration failure and out of service area, which is longer than the intermittent operation power source stopping time T1 for the regular PCH signal waiting within a service area, and the longest intermittent operation time T3 for the paging channel (PCH) signal waiting in the case that the high-speed movement is judged from the interval of position registration completion signals. Namely, the intermittent operation times are set according to the respective situations, therefore the battery saving operation can be most efficiently conducted. As a result, the battery consumption can be effectively reduced without damaging the communication performance of the mobile communication device.

Figure 4:
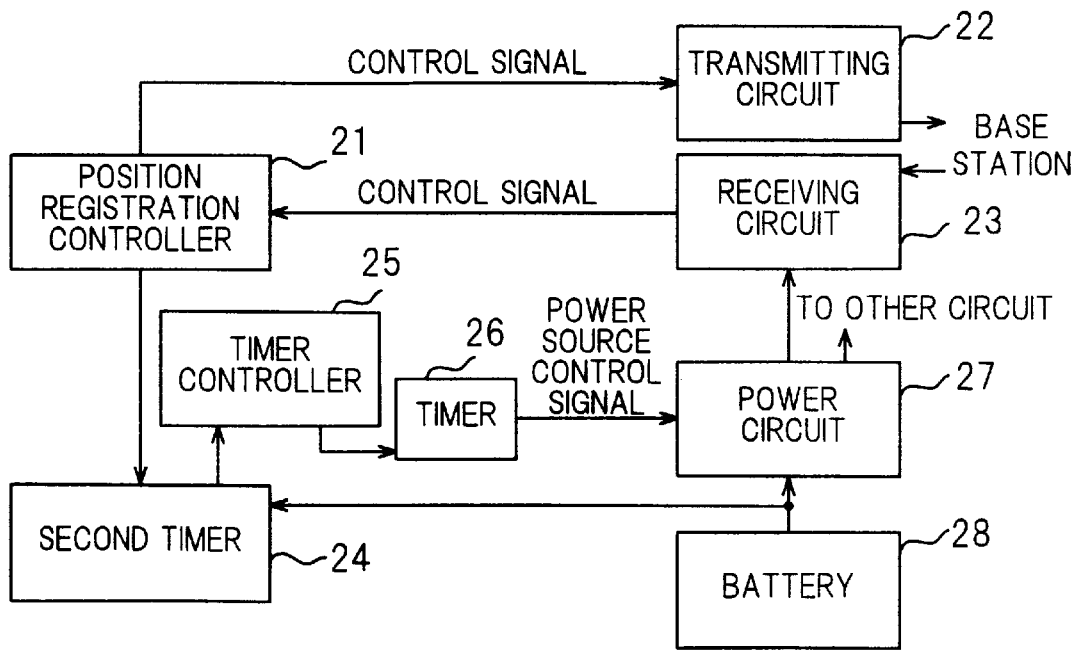
FIG. 4 is a block diagram showing the battery saving circuit of a mobile communication device in a preferred embodiment according to the invention.

Next, a mobile communication device in the preferred embodiment will be explained in FIG. 4.

Figure 3:
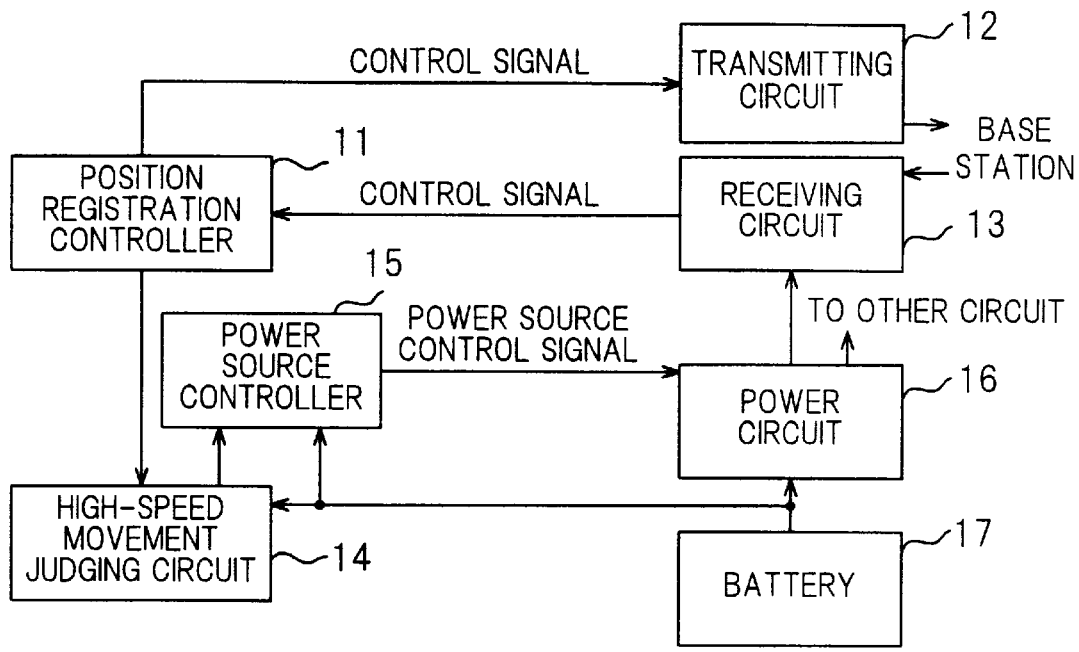
FIG. 3 is a block diagram showing the battery saving circuit of a mobile communication device for explaining the principle of the invention.

A transmitting circuit 22 and a receiving circuit 23 are like those explained in FIG. 3. The receiving circuit 23 receives a paging channel (PCH) signal to be transmitted from a base station, and then it demodulates it into a control signal and sends it to a position registration controller 21. The transmitting circuit 22 modulates a control signal for position registration from the position registration controller 21 into a signal wave which can be received by the base station and then transmits it to the base station through an antenna.

The position registration controller 21 controls a position registration operation determined for a mobile communication system. This position registration is conducted according to a control signal from the receiving circuit 23. If necessary, a control signal is transmitted and received through the transmitting circuit 22 to and from the base station. When a current position is out of any service area in base station search based on a control signal from the receiving circuit 23, a signal which shows that it is out of any service area is output. When it is within a service area, a control signal required for the position registration is transmitted and received through the transmitting circuit 22 and receiving circuit 23 to and from the base station to conduct the position registration. After completing the position registration, a position registration completion signal is output to a timer controller 25 and a second timer 24. Further, when a PCH signal is received in a paging channel (PCH) waiting operation, a signal representing the reception of the PCH signal is output to the timer controller 25. Meanwhile, the second timer 24 corresponds to the high-speed movement judging circuit 14 in FIG. 3, as explained later. The timer controller 25 and a timer 26 correspond to the power source controller 15 in FIG. 3.

The second timer 24 conducts the high-speed movement judgment, where the interval of position registration completion signals from the position registration controller 21 is measured and, when the interval of the position registration completion signals is shorter than a predetermined time, it is judged that it is moving at a high speed and a signal representing the high-speed movement is output to the timer controller 25.

The timer controller 25 serves to control the power source together with the timer 26. It sets, to the timer 26, an intermittent operation time T1 for the regular PCH signal waiting within a service area when receiving a signal representing the position registration completion from the position registration controller 21 or a signal representing the reception of a paging channel (PCH) from the base station. Also, it sets, to the timer 26, an intermittent operation time T2 which is longer than the intermittent operation time T1 when receiving a signal representing the position registration failure or out of service area. Further, it sets, to the timer 26, a longest intermittent operation time T3 when receiving a signal representing the high-speed movement from the second timer 24.

The timer 26 starts a counter operation when any one of the intermittent operation times T1, T2 and T3 is set by the timer controller 25. During the counter operation, it outputs a power source control signal to turn off a power circuit 27. When the counting for the intermittent operation time to be set is completed, it sends the power circuit 27 a control signal to supply the power source to the respective functional circuits (other than the second timer 24, timer controller 25, and timer 26) and stops the counter operation.

The power circuit 27 is powered by a battery 28 and controls the supply of power source to the functional circuits other than the second timer 24, timer controller 25 and timer 26 by the power source control signal received from the timer 26.

Figure 5:
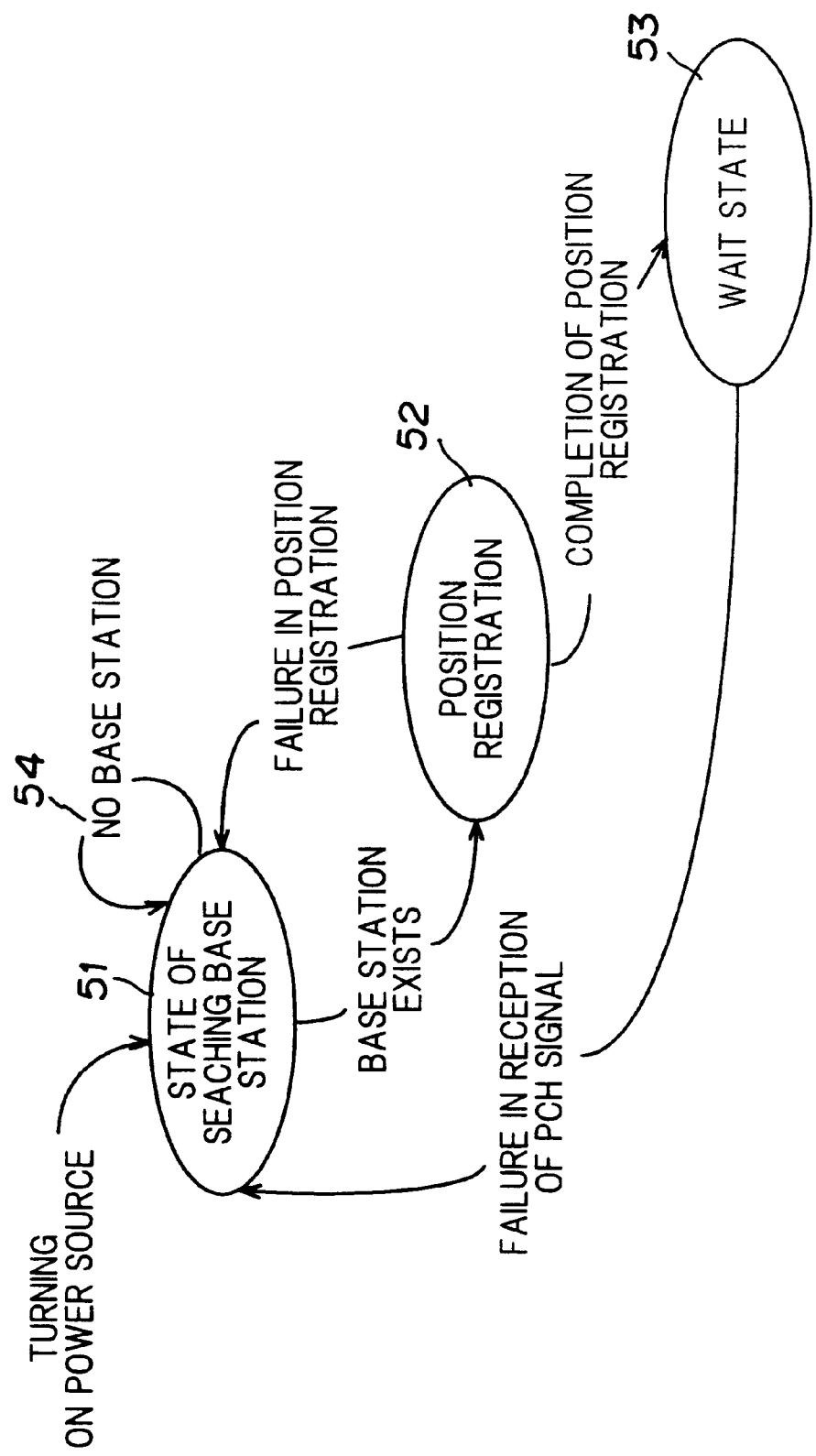
FIG. 5 is an illustration for explaining transitions of state in the embodiment according to the invention.

Next, the transition from turning on power source to the state of waiting a paging channel (PCH) signal in the embodiment of the invention will be explained in FIG. 5.

After turning on the power source, the mobile station steps into a base station search state 51 to search a nearby base station. In the base station search state, the position registration controller 21 receives a control signal from the nearby base station through the receiving circuit 23, selecting a base station to be connected with its mobile station. In the selecting, for example, a base station with a strongest received electric field is selected. In case of no base station (54), it is judged that the mobile station is out of any service area and the base station search is repeated while conducting the intermittent operation with the intermittent operation time T2.

When a base station is selected, it proceeds to a position registration state 52. In the position registration state, the position registration controller 21 transmits and receives a control signal through the transmitting circuit 22 and receiving circuit 23 to and from the base station to conduct the registration of its mobile station to the base station. After completing the position registration, it proceeds to the state 53 of waiting a paging channel (PCH). When failing in the position registration, it is judged that the base station is out of the service area, then proceeding to the base station search state 51, repeating the base station search while conducting the intermittent oeperation with the intermittent operation time T2.

In the paging channel (PCH) waiting state 53, the reception of the PCH signal assigned to its mobile station is waited while conducting the intermittent operation with a power source stopping period of the intermittent operation time T1. When the PCH signal is not received, it is judged that the mobile station is out of the service area, then processing to the base station search state 51, repeating the base station search while conducting the intermittent operation with a power source stopping period of the intermittent operation time T2.

An example of control signal format in the waiting state will be explained in FIGS. 6A and 6B.

As shown in FIG. 6A, a control signal with a control signal frame period Tf is transmitted from the base station to the mobile station. This control signal is composed of a broadcast control channel (BCCH), paging channels (PCHs 1 to 6) and a signaling control channel (SCCH). The paging channels PCHs 1 to 6 are control signals for calling respective receiving groups, which are divided corresponding to PCHs 1 to 6. FIG. 6B shows an example where its mobile station is included in receiving group 1 and on by the PCH1 signal to control the receiving group 1 is received. In this case, the regular PCH waiting intermittent operation period is Tf, a length between neighboring BCCHs and its power source stopping period T1 is a value obtained by subtracting the receiving time of one paging channel PCH1 from a battery saving period Tb, i.e., the length Tf between neighboring BCCHs.

Next, timing of the intermittent operation in the embodiment will be explained in FIGS. 7A to 7C.

FIG. 7A shows a intermittent operation when the position registration is completed. During the position registration process, the power circuit 27 turns on. After completing the position registration process, the waiting operation is conducted by repeating turning off the power supply by the power source stopping period T1 to save the battery, and then turning on the power supply when a paging channel (PCH) signal is received.

FIG. 7B shows an intermittent operation in case of a failure in position registration failure and out of any service area. The position registration operation is conducted turning on the power supply. When failing in the position registration at the time t1, the power supply is turned off and then the base station search operation is conducted again turning on the power supply after a power source stopping period corresponding to the intermittent operation time T2. When failing in the base station search operation again at the time t2, it is judged that the mobile station is out of any service area and the power supply is turned off. Thereafter, the base station search operation is repeated turning off the power supply by the intermittent operation time T2 and then conducting again the base station search until the base station search succeeds.

FIG. 7C shows an intermittent operation in case of the high-speed movement. After receiving a paging channel (PCH) signal in wait state, when failing in the reception of PCH signal at the time t3, the base station search process and position registration process are conducted. The position registration process is completed at the time t4. During the high-speed movement, the position registration completion interval from the time t3 to t4 is shorter than a predetermined time. When the position registration completion interval is shorter than the predetermined time, it is judged that the mobile station is moving at a high speed and the power supply is turned off. Then, after a power source stopping period corresponding to the intermittent operation time T3, the base station search is conducted again turning on the power supply.

Next, the battery saving operation in the embodiment will be explained in FIG. 8.

When the battery saving operation starts after turning on the power source, division of state is first conducted at Step S301. In case of the base station search state to be judged on the division of state at Step S301, it proceeds to Step S302 where it is judged whether the base station search is completed or not. If the base station search is completed, it proceeds to Step S303, where it is judged whether the base station search is successful or not. If the base station search is successful, it proceeds to Step S304 to transfer to the position registration state and then the position registration process starts at Step S305. On the other hand, when failing in the position registration at Step S303, it proceeds to Step 306, setting the intermittent operation time T2 to the timer 26, and then the timer 26 outputs the power source control signal to turn off the power circuit 27 by the intermittent operation time T2. When it is judged that the base station search is not completed at Step S302, it proceeds to Step S307 to continue the base station search.

Next, in case of the position registration state to be judged on the division of state at Step S301, it proceeds to Step S308 where it is judged whether the position registration is completed or not. If the position registration is completed, it proceeds to Step S309, where it is judged whether the position registration is successful or not. If the position registration is successful, it proceeds to Step S310, where it is judged whether the position registration interval is within a predetermined time or not. If within the predetermined time, it proceeds to Step S311 by the judgment of high-speed movement, setting the intermittent operation time T3 to the timer 26, transferring to the base station search state. The timer 26 outputs the power source control signal to turn off the power circuit 27 by a period corresponding to the intermittent operation time T3.

When the position registration interval is longer than the predetermined time at Step S310, it proceeds to Step S312 to transfer to the wait state and then the wait state starts at Step S313.

When failing in the position registration at Step S309, it proceeds to Step S314, setting the intermittent operation time T2 to the timer 26, and then the timer 26 outputs the power source control signal to turn off the power circuit 27 by a period corresponding to the intermittent operation time T2.

When it is judged that the position registration is not completed at Step S308, it proceeds to Step S315 to continue the position registration process.

Finally, in case of the wait state to be judged on the division of state at Step S301, it proceeds to Step S316 where it is judged whether the paging channel (PCH) signal catching process is completed or not. If the catching process is completed, it proceeds to Step S317, where it is judged whether the catching of PCH signal is successful or not. If the catching of PCH signal is successful, it proceeds to Step S318, setting the intermittent operation time T1 to the timer 26. The timer 26 outputs the power source control signal to turn off the power circuit 27 by a period corresponding to the intermittent operation time T1.

When failing in the catching of paging channel (PCH) signal at Step S317, it proceeds to Step S319 to transfer to the base station search state.

When it is judged that the catching of paging channel (PCH) signal is not completed at Step S316, it proceeds to Step 320 to continue the PCH signal catching process.

In the above embodiment, for the battery saving operation during high-speed movement and the battery saving operation when out of any service area, the mobile station may be provided with a switch by which its user can select permission/prohibition of the respective battery saving operations. The switch to select permission/prohibition of the battery saving operation during high-speed movement can control whether to conduct the process in Step S311 in FIG. 8 or not. Also, the switch to select permission/prohibition of the battery saving operation when out of any service area can control whether to conduct the processes at Steps S306 and S314 in FIG. 8 or not.

Therefore, the user can make it conduct the waiting operation as long as possible even during high-speed movement. Also, the user can make it transfer to the wait state as fast as possible even when out of any service area. Thus, the communication operations desired by the user can also be conducted while achieving an effective battery saving operation.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A mobile communication device, comprising:
   a position registration controller which controls a position registration process where a position of said mobile communication device is registered to a base station;
   a transmitting circuit which transmits a position registration control signal for said mobile communication device which is processed by said position registration controller;
   a receiving circuit which receives a position registration control signal for said base station to be transmitted from said base station;
   a high-speed movement judging circuit which judges whether said mobile communication device is moving at a high speed or not by monitoring an interval of position registration;

a power source controller which controls a power source to be supplied to functional circuits with an intermittent operation time to be determined by an output of said high-speed movement judging circuit;

a power circuit which supplies a power source to said functional circuits except at least said the power source controller; and a battery which supplies said power source to said power circuit;

wherein said position registration controller controls said position registration process to be determined by a mobile communication system where said mobile communication device itself is included, outputting a control signal for controlling said power source controller when said mobile communication device is out of any service area as the result of a base station search nearby itself, transmitting a control signal necessary for position registration from the transmitting circuit when said mobile communication device is within a service area as the result of said base station search, thereafter receiving said position registration control signal to be transmitted from said base station by said receiving circuit and conducting position registration between said base station and said mobile communication device itself, and outputting said control signal for controlling said power circuit after competing said position registration.

2. A mobile communication device, according to claim 1, wherein:

said power source controller controls said power circuit by a first intermittent operation time when said high-speed movement judging circuit judges that said mobile communication device is moving at a high speed, controlling said power circuit by a second intermittent operation time when it receives a judgment signal that said mobile communication device is out of any service area from said position registration controller, and controlling said power circuit by a third intermittent operation time when it receives a judgment signal that said mobile communication device is within a service area from said position registration controller and conducts an intermittent operation.

3. A mobile communication device, according to claim 2, wherein:

said second intermittent operation time has a power source stopping time longer than that of said third intermittent operation time, and said first intermittent operation time has a power source stopping time longer than that of said second intermittent operation time.

4. A mobile communication device, according to claim 3, wherein:

said power source controller counts said third intermittent operation time when it receives a control signal to represent the completion of position registration from said position registration controller and a signal to represent the reception of a wait control signal from said base station, counting said second intermittent operation time when it receives a signal to represent a failure in position registration or being out of any service area, counting said first intermittent operation time when it receives a signal to represent high-speed movement from said high-speed movement judging circuit, and outputting a control signal to turn off said power source to be output from said power circuit during said counting operations.

5. A mobile communication device, according to claim 3, wherein:

said high-speed movement judging circuit measures an interval of position registration completion signals to be output from said position registration controller, judging that said mobile communication device is moving at a high speed when said interval of position registration completion signals is shorter than a predetermined time, and outputting said control signal to said power source controller.

6. A mobile communication device, according to claim 2, wherein:

said power source controller counts said third intermittent operation time when it receives a control signal to represent the completion of position registration from said position registration controller and a signal to represent the reception of a wait control signal from said base station, counting said second intermittent operation time when it receives a signal to represent a failure in position registration or being out of any service area, counting said first intermittent operation time when it receives a signal to represent high-speed movement from said high-speed movement judging circuit, and outputting a control signal to turn off said power source to be output from said power circuit during said counting operations.

7. A mobile communication device, according to claim 6, wherein:

said high-speed movement judging circuit measures an interval of position registration completion signals to be output from said position registration controller, judging that said mobile communication device is moving at a high speed when said interval of position registration completion signals is shorter than a predetermined time, and outputting said control signal to said power source controller.

8. A mobile communication device, according to claim 2, wherein:

said high-speed movement judging circuit measures an interval of position registration completion signals to be output from said position registration controller, judging that said mobile communication device is moving at a high speed when said interval of position registration completion signals is shorter than a predetermined time, and outputting said control signal to said power source controller.

9. A mobile communication device, according to claim 1, wherein:

said power source controller controls said power circuit by a first intermittent operation time when said high-speed movement judging circuit judges that said mobile communication device is moving at a high speed, controlling said power circuit by a second intermittent operation time when it receives a judgment signal that said mobile communication device is out of any service area from said position registration controller, and controlling said power circuit by a third intermittent operation time when it receives a judgment signal that said mobile communication device is within a service area from said position registration controller and a conducts an intermittent operation.

10. A mobile communication device, according to claim 9, wherein:

said second intermittent operation time has a power source stopping time longer than that of said third intermittent operation time, and said first intermittent operation time has a power source stopping time longer than that of said second intermittent operation time.

11. A mobile communication device, according to claim 1, wherein:

said high-speed movement judging circuit measures an interval of position registration completion signals to be output from said position registration controller, judging that said mobile communication device is moving at a high speed when said interval of position registration completion signals is shorter than a predetermined time, and outputting said control signal to said power source controller.

12. A mobile communication device, according to claim 1, wherein:

said high-speed movement judging circuit measures an interval of position registration completion signals to be output from said position registration controller, judging that said mobile communication device is moving at a high speed when said interval of position registration completion signals is shorter than a predetermined time, and outputting said control signal to said power source controller.

13. A mobile communication device, according to claim 1, further comprising:

a manual operation means which invalidates the operation of said high-speed movement judging circuit.

14. A mobile communication device, according to claim 1, further comprising:

a manual operation means which invalidates the operation of said power source controller.

15. A mobile communication device, according to claim 1, wherein:

said power source controller includes a plurality of timers and a timer controller, predetermined one of said plurality of timers inputting a control signal from said position registration controller, said timer controller controlling said plurality of timers other than said predetermined one timer by an output of said predetermined one timer and an output of said position registration controller, and said power source controller controls the operation of said power circuit by outputs of said plurality of timers.

16. A mobile communication device, comprising:

a position registration controller which controls a position registration process where a position of said mobile communication device is registered to a base station;

a transmitting circuit which transmits a position registration control signal for said mobile communication device which is processed by said position registration controller;

a receiving circuit which receives a paging channel signal to be transmitted from said base station and extracts a position registration control signal for said transmitting base station;

a high-speed movement judging circuit which judges whether said mobile communication device is moving at a high speed or not by monitoring an interval of position registration;

a power source controller which controls said power source controller by selecting a first intermittent operation time in case of a regular paging channel signal waiting state, selecting a second intermittent operation time longer than said first intermittent operation time in case of a failure in position registration, or selecting a third intermittent operation time longer than said second intermittent operation time in case of high-speed movement;

a power circuit which supplies a power source to functional circuits except said the power source controller while being controlled by said power source controller; and a battery which supplies said power source to said power circuit.

17. A mobile communication device, according to claim 15, wherein:

said power source controller includes a plurality of timers and a timer controller, predetermined one of said plurality of timers inputting a control signal from said position registration controller, said timer controller controlling said plurality of timers other than said predetermined one timer by an output of said predetermined one timer and an output of said position registration controller, and said power source controller controls the operation of said power circuit by outputs of said plurality of timers.

* * * * *